WILLIAM A. LEWIS.

Improvement in Wagon Axles.

No. 4,584. Reissued Oct. 10, 1871.

ATTEST.

Walter Allen

Wm. H. Dereton Jr.

INVENTOR.

Wm. A. Lewis

By Knight Bros

Attorneys.

THE NORRIS PETERS CO., WASHINGTON, D. C

UNITED STATES PATENT OFFICE.

WILLIAM ARNOLD LEWIS, OF CHICAGO, ILLINOIS, ASSIGNOR TO HOLLOW-AXLE MANUFACTURING COMPANY.

IMPROVEMENT IN WAGON-AXLES.

Specification forming part of Letters Patent No. 108,607, dated October 25, 1870; reissue No. 4,584, dated October 10, 1871.

*To all whom it may concern:*

Figure 1:
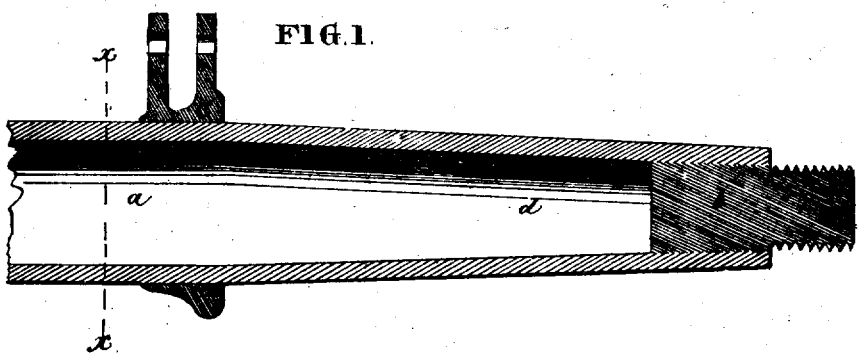
Figure 2:
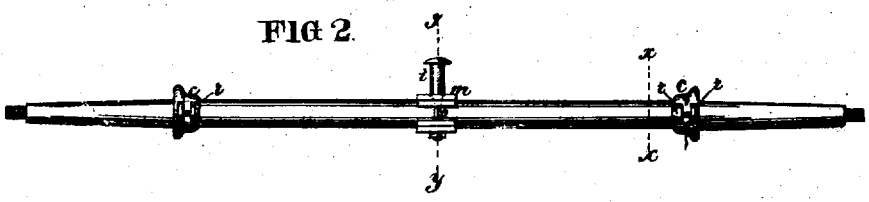
Figure 4:
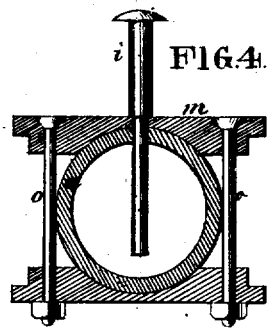
Figure 5:
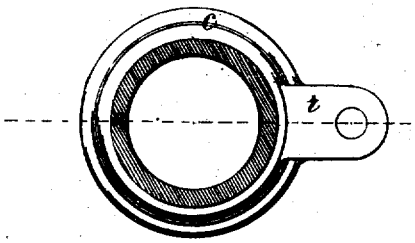

Be it known that I, WILLIAM ARNOLD LEWIS, of Chicago, in the county of Cook, and State of Illinois, have invented certain Improvements in Wagon-Axles, of which the following is a specification:

In the drawing, Figure 1 is a longitudinal sectional view of the spindle and part of the axle. Fig. 2 is a front elevation of a forward axle on a smaller scale; Fig. 3, a cross-sectional view at *x x*, Figs. 1 and 2; Fig. 4, a cross-sectional view at *y y*, Fig. 2.

The first improvement I claim to have made is in the use of a pipe or hollow tube, *a*, having the ends swaged to a taper to form the journal or spindle *d* without the use of skeins or other external additions, as bearings, for the boxes to wear on, as shown in Fig. 1. The spindle *d* may be case-hardened to make it more durable. The wrought-iron collar *c* is shrunk on to form a butting-ring or shoulder for the hub to run against. Another improvement I claim to have made is in the king-bolt clip and the arrangement of the bolt at the center of the axle. The king-bolt *i* passes through the clip *m*, which is held in place by the bolts *o*. The upper part of the clip furnishes a seat for the end of the reach, and the whole arrangement strengthens the axle at the center, as it is not necessary to have a hole entirely through the axle at that point, as is shown in Fig. 4. The collars *c* are furnished with the lugs or hinges *r* for the thills, thus saving another set of thill-clips. *b* is a plug welded into the ends of the axles to receive the nut which holds the wheel.

Having thus described my invention, what I claim as new, and desire to secure by Letters Patent, is—

1. A wagon-axle made from tubing by swaging taper spindles upon the ends.

2. The combination of the clip *m*, bolts *o*, king-bolt *i*, and axle *a*, constructed and arranged substantially as and for the purposes set forth.

3. The combination of the collar *c*, hinge *r*, and axle *a*, constructed and arranged as and for the purposes set forth.

WM. A. LEWIS.

Witnesses:
B. C. AVERY,
WM. LITTLE.

(31)